J. INGELS.
Grain-Drill.
No. 18,590. Patented Nov. 10, 1857.
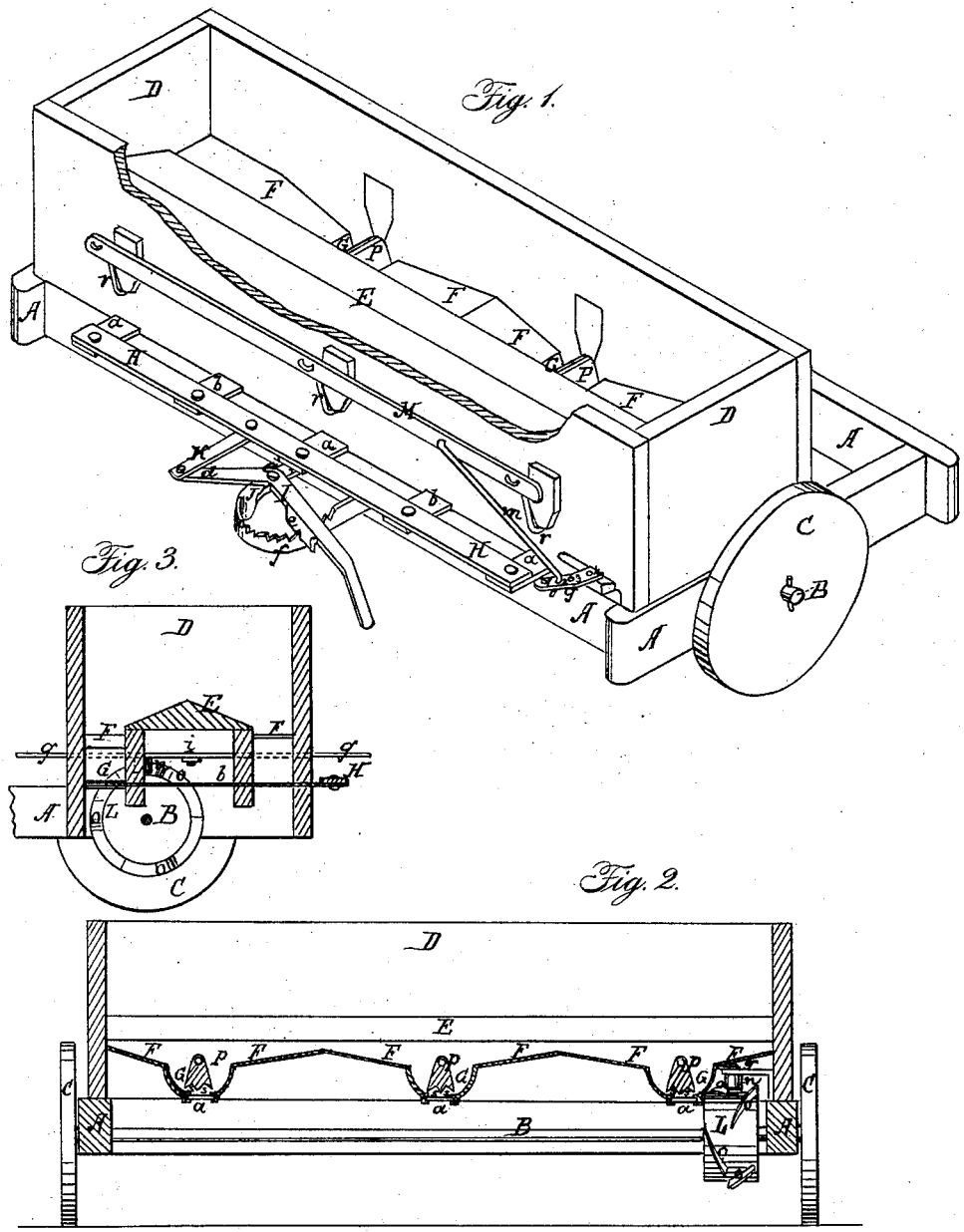

UNITED STATES PATENT OFFICE.

JOSEPH INGELS, OF FAYETTE COUNTY, INDIANA.

IMPROVEMENT IN GRAIN-DRILLS.

Specification forming part of Letters Patent No. 18,590, dated November 10, 1857.

*To all whom it may concern:*

Be it known that I, JOSEPH INGELS, of the county of Fayette and State of Indiana, have invented a new and useful Improvement in Grain-Drills; and I do hereby declare that the following is a full, clear, and exact description of the construction and operation of the same, reference being had to the annexed drawings, making a part of this specification, in which—

Figure 1 is a perspective view; Fig. 2, a longitudinal vertical section through the rear feeding-hopper and cells; Fig. 3, a transverse vertical section through the machine.

Similar letters of reference, where they occur in the several drawings, denote like parts of the machine in all of them.

My invention relates to the combined use of the hopper, cells, and vibrating blocks, with their serrated ends working in said cells in a manner that will be explained.

To enable others skilled in the art to make and use my invention, I will proceed to describe the same with reference to the drawings.

A represents a rectangular frame, supported upon an axle, B, that is in turn supported in a pair of carrying-wheels, C C. Upon this frame A is mounted the hopper D, which is divided longitudinally into two by a dividing-board, E, the top of which slopes off toward the two sets of feeding-cells.

In the subdivisions of the hopper or seed-box there are bottom boards or plates, F, which incline toward the exit-openings to conduct the seeds thereto.

G are the seed-cells proper, as shown in Fig. 2. They have slides $a\,a\,a$, fitting to their bottom portions, which can be all opened or closed simultaneously to adjust them to the quantity of seed to be sown or to stop it off entirely. These slides $a\,a\,a$ are all connected to a bar, H, Fig. 1, and to the same bar are also connected other slides, $b\,b$, which extend clear across the hopper, and in like manner open or close the cells on that side also.

A bent lever, I, pivoted to a support, J, at the point $c$, has its arm $d$ pivoted to the bar K, which in turn is connected to the bar H, and by these connections the slides $a\,a\,a$ and $b\,b$ are operated, a dog, $e$, on the other arm of the lever catching and holding it to the properly-adjusted position by taking into one of the teeth of the ratchet $f$.

On the axle B of the machine, which turns with the wheels, is placed a cam or zigzag wheel, L, which, as it revolves, vibrates a lever, $g$, which is pivoted at its center $i$ to the frame of the machine, there being a friction-roll, $n$, on said lever $g$, against which the wings or cams $o$ on said wheel L strike to cause the vibratory motion of the said lever. Both ends of this lever $g$, where they extend beyond the sides of the hopper, are provided with a series of holes, 1 2 3 4, into one of which the hook on one end of a connecting-rod, $m$, is placed, the other end of said rod being connected to a bar, M, which gives to said bar M a reciprocating motion longitudinally of the hopper. To this bar M are connected the ends of crank-rods $r\,r\,r$, which have their other ends attached to the blocks P P P, Figs. 1, 2, which are pivoted one in each of the seed-cells G. The motion communicated to the bar M is thus transmitted to the blocks or feeders P. These feeders have cups or recesses $s$ formed in their under sides, so that as they are vibrated and the grain passes underneath them it will be caught by said recesses and forced to the exit-opening, and thus insure regular conveying of the seed out of the hopper.

I have described the several parts for giving motion to the feeders on one side or subdivision of the hopper. Those on the other side are precisely the same, and need no further explanation.

Having thus described the nature and object of my invention, I would state that I am aware that a seed-slide has been operated from a zigzag wheel and caused to draw or force the grain to the exit. This I do not claim; but

What I do claim as new, and desire to secure by Letters Patent, is—

In combination with the cells G, the feeding-blocks P, vibrating in said cells, and provided with recesses $s$ for catching and forcing the grain to the exit-openings, substantially as herein described.

JOSEPH INGELS.

Witnesses:
JAMES K. DUGDALE,
OLIVER BUTLER.